July 25, 1939.    J. W. BRYCE    2,166,928
MULTIPLYING MACHINE
Filed May 10, 1934    8 Sheets-Sheet 1

INVENTOR
James W. Bryce
BY
Cooper, Kerr & Dunham
ATTORNEYS

July 25, 1939.  J. W. BRYCE  2,166,928
MULTIPLYING MACHINE
Filed May 10, 1934   8 Sheets-Sheet 5

FIG. 3c.

INVENTOR
James W. Bryce
BY
Cooper, Kerr & Dunham
ATTORNEYS

July 25, 1939. J. W. BRYCE 2,166,928
MULTIPLYING MACHINE
Filed May 10, 1934 8 Sheets-Sheet 6

INVENTOR
James W. Bryce
BY
Cooper, Kerr & Dunham
ATTORNEYS

FIG.6.

July 25, 1939.  J. W. BRYCE  2,166,928
MULTIPLYING MACHINE
Filed May 10, 1934    8 Sheets-Sheet 8

FIG.6a.

INVENTOR
James W. Bryce
BY
Cooper, Kerr & Dunham
ATTORNEYS

Patented July 25, 1939

2,166,928

UNITED STATES PATENT OFFICE 2,166,928

MULTIPLYING MACHINE

James W. Bryce, Bloomfield, N. J., assignor to International Business Machines Corporation, New York, N. Y., a corporation of New York Application May 10, 1934, Serial No. 724,921

21 Claims. (Cl. 235—61.6)

This invention relates to improvements in accounting machines and more particularly to multiplying accounting machines. Previous multiplying machines are generally of two types, i. e. (1) over and over addition machines; and (2) partial product machines. The former class of machine is relatively simple in construction but is usually slow in operation on account of the multiplicity of operations required to enter a multiplicand a multiplicity of times in accordance with the amount of the multiplier. The latter type of machine is relatively more complicated in construction but is relatively more rapid in operation.

The present invention has for one of its objects the provision of an improved type of multiplying machine which will have the advantages of both of the foregoing types of machines without having the disadvantageous features thereof.

A further object of the present invention is the provision of a novel type of multiplying machine which obtains products by addition steps which are relatively faster than the addition steps of the so-called "over and over" types of machines.

A further object of the present invention resides in the provision of a multiplying machine adapted to effect multiplying by addition steps, which includes the accumulating together of selected multiples of the multiplicand.

A further object of the present invention resides in the provision of a novel type of multiplying accounting machine provided with means whereby the machine will automatically set up a pre-selected set of complete multiplicand multiples based upon an entered multiplicand and thereafter automatically combine required multiple, multiplicand components in accordance with the various significant digits of an entered multiplier.

A further object of the present invention resides in the provision of a record controlled and/or record making accounting machine having the characteristics set forth in the foregoing objects.

Further and other objects of the present invention will be hereinafter set forth in the accompanying specification and claims and shown in the drawings which show by way of illustration a preferred embodiment and the principle thereof and what I now consider to be the best mode in which I have contemplated of applying that principle. Other embodiments of the invention employing the same or equivalent principle may be used and structural changes made as desired by those skilled in the art without departing from the present invention and within the spirit of the appended claims.

Before describing the construction of the machine to which the present invention is shown applied, the general principles under which the machine operates and the general mode of operation will be set forth.

According to the present invention the machine carries out multiplication in the following manner. The multiplier and multiplicand are first entered into the machine, there being a double entry of the multiplicand, i. e. it is entered into each of two separate entry receiving devices. Upon the entry of the multiplicand amount in one of these entry receiving devices a setup is made for a subsequent readout of the multiplicand itself, and a setup is also made for a subsequent readout of the multiplicand doubled or multiplied by 2. Thereafter automatic machine operations cause the readout of the doubled multiplicand amount and the entry of such amount into the other entry receiving device which received the multiplicand amount originally and also into another entry receiving device. This operation is repeated so that finally by addition methods these other entry devices will have set up therein respectively four times the multiplicand and five times the multiplicand. The primary multiplicand entry device will have its readout in such relation that the multiplicand itself may be read out therefrom or the amount of the multiplicand multiplied by 2 may be read out therefrom. Suitable readouts are also provided so that five times the amount of the multiplicand can be read out from one of the other entry receiving devices and four times the amount of the multiplicand from another entry receiving device.

The machine thereafter automatically utilizes the entered multiplier to control reading out operations from the various readout sections of the multiplicand entry receiving devices into product accumulators, of which there are two, and into which the components of products may be concurrently entered when required.

To illustrate: To multiply a given multiplicand by 9 there would be a concurrent readout of the multiplicand times 4 from one readout device and of the multiplicand times 5 from another readout device and there would be the concurrent entry of these amounts into two product accumulators. Finally the machine gathers together the product component amounts in one accumulator to give the desired final product result.

In carrying out multiplication according to the present invention use is made of the elementary principle of arithmetic that a digital series which comprises all of the different digits of a notation, say 1, 2, 3, 4, 5, 6, 7, 8 and 9, may also be expressed by using a lesser number of different digits and using them singly or in pairs to express all of the different terms of such complete series. Thus, considering the incomplete series of digital terms 1, 2, 4 and 5, the terms of this incomplete series are of such value that they may be used selectively in pairs to obtain any missing term of the complete series of terms from 1 to 9. For example, the complete series may be expressed thus:

1, 2, 2+1, 4, 5, 5+1, 5+2, 4+4 and 5+4

The digits 1, 2, 4 and 5 may be termed "pairable representing digits" for the complete series of all of the digits of a notation.

In controlling operations of a machine according to the value of the different multiplier digits, the machine first manifests the multiplier digits according to their true value, (i. e. 1 to 9 inclusive), then interprets such digits,—determining single or pairable selection, and which pairable digits are involved, and thereafter establishes controls according to the related pairable representing digits.

Considering now the multiplicand and the different digital multiples thereof such series of terms may be expressed as follows:

MC×1, MC×2, MC×3, MC×4, MC×5, MC×6, MC×7, MC×8, and MC×9.

This series may also be expressed by only using the terms of an incomplete series of different digital multiples of the multiplicand wherein the terms are of such value that they may be used singly or in pairs to express the complete series. Otherwise stated, an incomplete series of different digital multiples of a multiplicand may have terms of such value that they may be used selectively in pairs to obtain any missing term of the complete series of terms which comprises the multiplicand multiplied by all of the different digits of the notation. Thus a complete series of all of the digital multiples of the multiplicand may be expressed as follows:

MC×1, MC×2, MC×(1+2), MC×4, MC×5, MC×(5+1), MC×(5+2), MC×(4+4), and MC×(5+4).

In such series the multiples of the multiplicand MC×1, MC×2, MC×4 and MC×5 may be termed "pairable representing multiples of the multiplicand" which are usable singly and in pairs to express each and all of the different terms of the series which comprise the multiplicand multiplied by all of the different digits of a notation.

In carrying out the present invention, provision is made for building and storing representations of an incomplete series of different digital multiples of a multiplicand having terms of such value that such representing multiples of the multiplicand may be used selectively in pairs to obtain any missing terms of the complete series which comprises the multiplicand times all of the different digits of the notation. Otherwise expressed the proper pairable representing multiples of the multiplicand are first built up and stored.

In effecting multiplying calculations after the pairable representing multiples of the multiplicand are available, multiplication of any multiplicand amount by any multiplier digit may be effected by either entering in the product receiving means the multiplicand multiple which directly corresponds to a multiplier digit or, when a manifested multiplier digit requires a pair of digits to represent it, summing up therein the corresponding pairable representing multiples of the multiplicand.

It will be understood that each of all of the multiples of the multiplicand as stored and which comprise the pairable representing multiples of the multiplicand is complete in itself. That is to say, it includes carry increments. Such carry increments are always included in the stored multiples of the multiplicand irrespective of what the value of the multiplicand may be and irrespective of the value of the multiplier digits. Such multiples of the multiplicand in complete form also constitute complete sub-products. By complete sub-products I do not mean partial products or sub-products which only consist of a right hand or left hand component product. By "complete sub-products" I mean components of the complete multiplied result such as the multiplicand multiplied by a multiplier digit, or by a pairable representing multiplier digit. Such results are complete and include carry increments before the entry into the result receiving means. The complete sub-products consist always of both right and left hand partial products added together and including carry increments irrespective of the value of the multiplicand amount and irrespective of the value of the multiplier digit which produces such complete sub-product.

The accounting machine to which the present invention is shown as applied, so far as various units and the manner of drive is concerned, is substantially the same as the machine shown and described in the United States patents to Cunningham, No. 1,933,714 and Oldenboom, No. 1,944,665 to which reference may be had for a fuller description of the general operation of various units and the manner of drive. There are certain differences in the present construction over that of the machine shown in the above mentioned patent which will be briefly alluded to here.

In lieu of providing a direct drive for the contact roll 87, a creeping drive is provided of the type shown and described in the United States application of George F. Daly, Serial No. 643,663, filed November 21, 1932. The creeping drive includes supplemental gearing 81a, 81b, 81c and 81d for driving the contact roll 87 with a creeping movement. The machine includes an entry receiving device or amount manifesting means for the multiplier, designated MP on Fig. 1. On this figure there is also shown an accumulator for receiving Z components of products which is designated LP. Other Z components of products are received in an accumulator designated RP on Fig. 1a.

Figures 1, 2:
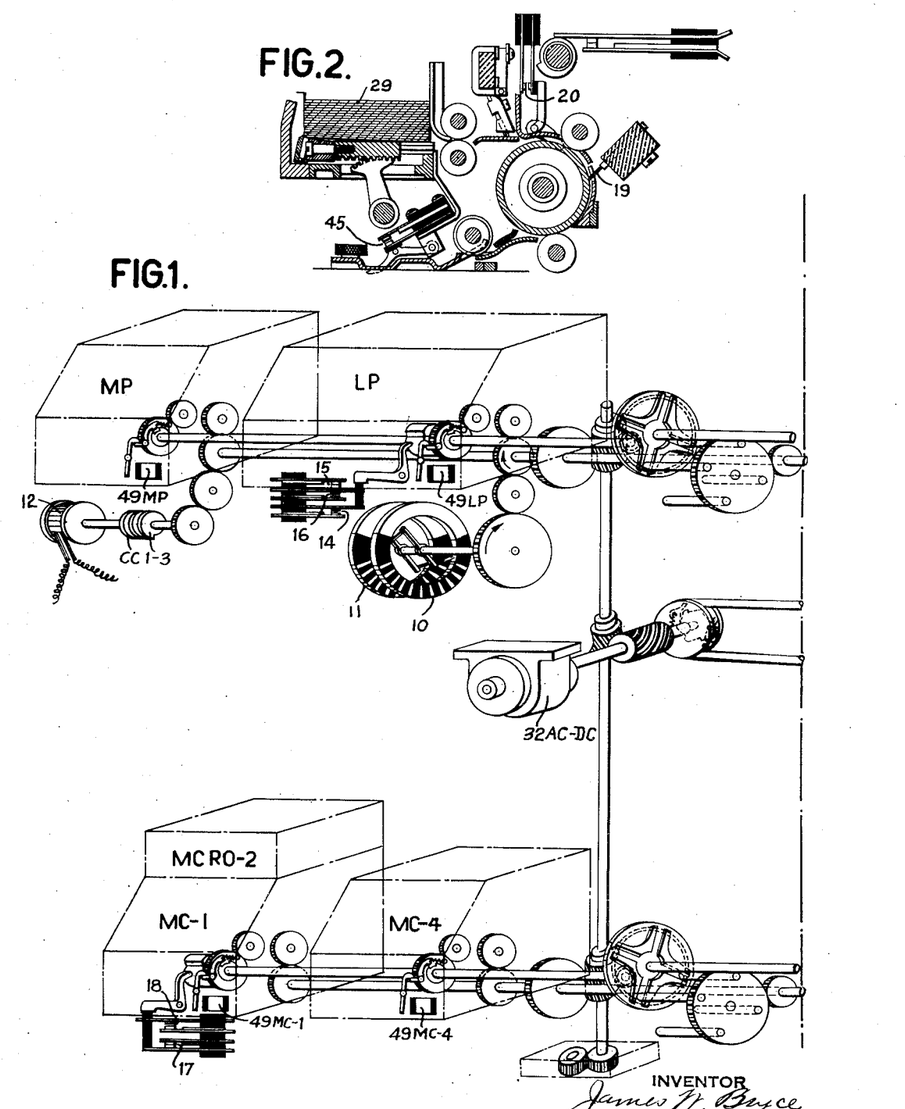
Figures 1 and 1a taken together, show somewhat diagrammatically the driving mechanism of the machine and the various sections thereof.
Fig. 2 is a cross-sectional view of the card feed, card handling and sensing section of the machine.

For receiving the multiplicand from the card there is provided an entry receiving device which may also be of accumulator form designated MC—1 on Fig. 1. There are furthermore supplemental multiplicand multiple component accumulators designated MC—4 (Fig. 1) and MC—5 (Fig. 2). These various accumulators are driven in the same manner as correspondingly located accumulator units in the Cunningham patent above referred to and there is a reset drive generally similar to that shown in the Cunningham patent.

Figure 1A:
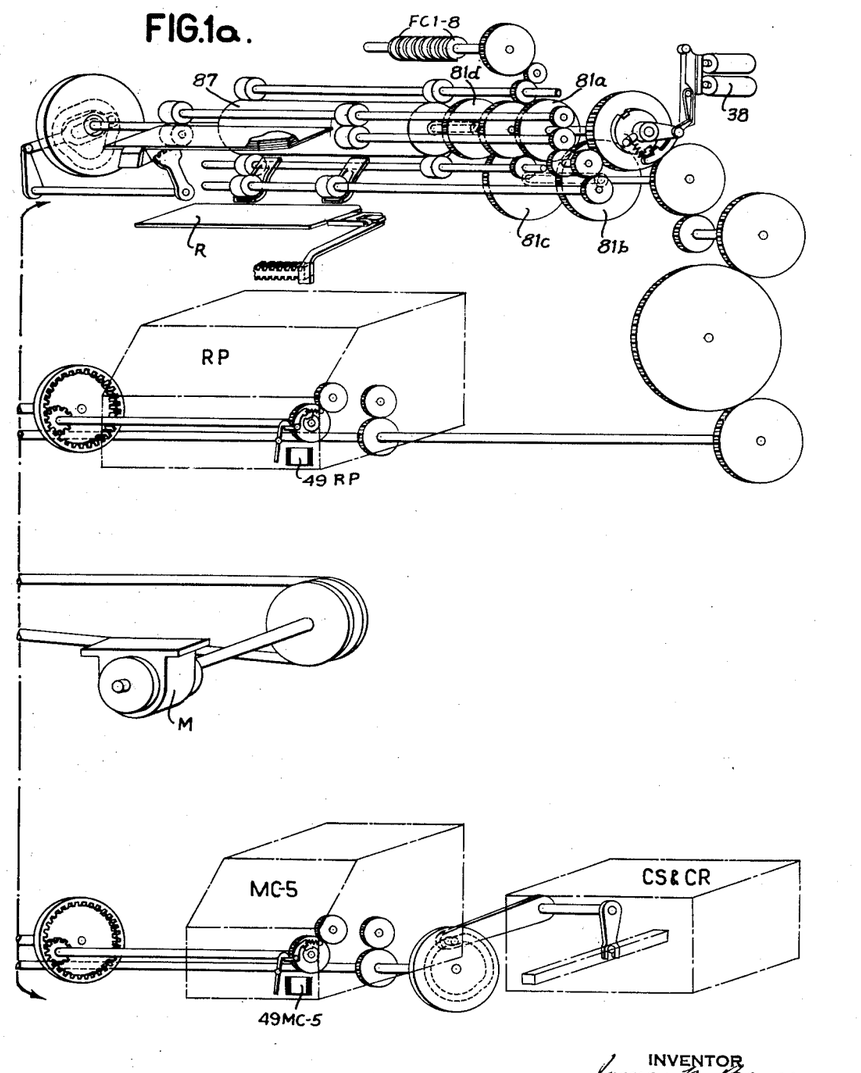

The machine also includes a column shift and control relay section CS and CR (Fig. 1a). It may be further explained that the MC—1 accumulator is provided with a supplemental readout section for reading out from this accumulator double the amount of the multiplicand introduced therein. This is designated MCRO—2 on Fig. 1. The machine includes two impulse emitters 10 and 11 (see Fig. 1).

In the present machine there are eight FC cam contacts which are designated FC—1 to 8 inclusive on Fig. 1a. The machine also includes cam contacts CC—1 to 3 (Fig. 1a) which are driven from the counter drive shaft in the indicated manner. The machine also includes an impulse distributor 12. The LP accumulator resetting devices control two sets of contacts, one designated 14 and comprising a pair of contacts which are adapted to be closed upon reset and, the other being a three-blade contact arrangement involving two pairs of contacts 15 and 16. Contacts 15 open upon reset and 16 close upon reset. The MC—1 accumulator reset devices control two pairs of contacts 17 and 18. Contacts 17 open upon reset and contacts 18 close upon reset.

Referring now to Fig. 2, the card handling and sensing section of the machine is generally the same as in the Cunningham Patent No. 1,933,714. The readout or sensing brushes are shown and designated 19. There are also shown card lever contacts 20.

Complete details of the punch are not shown herein as they are substantially the same as the punch described in the Cunningham or Oldenboom patents. A fragment of the punch is shown in Fig. 1a in proximity to the card R in the entering section of the punch.

Operation

Before describing the circuit diagram of the machine the general mode of operation of the machine will be briefly explained. It will be assumed that the present machine is intended to handle multiplier and multiplicand entries each of a maximum of four columns. Obviously the machine may have a greater capacity. Upon a card entering the sensing section of the machine the sensing brushes 19 sense the multiplier and multiplicand fields of the card and enter the multiplier into the MP receiving device and enter the multiplicand into the MC—1 receiving device and into the MC—5 device. As explained before the MC—1 accumulator has a supplemental readout section designated MCRO—2. Accordingly, upon the entry of the multiplicand into the MC—1 accumulator there will be a setup on the MCRO—1 readout of the multiplicand itself and upon the MCRO—2 readout there will be a setup of the multiplicand multiplied by 2 or the multiplicand component corresponding to 2. Upon the accumulator cycle, which immediately follows the accumulator cycle in which amounts are read from the card, there is a further reading out and entering cycle in which double the amount of the multiplicand is read out from the MCRO—2 readout and is directed and entered into both the MC—4 entry receiving device and into the MC—5 entry receiving device. There will accordingly now be standing in the MC—4 and MC—5 accumulators amounts which are respectively two times the amount of the multiplicand and three times the amount of the multiplicand. Following this cycle there is a further transfer over of double the multiplicand amount into both the MC—4 and MC—5 accumulators so that at the end of this third counter cycle the MC—4 accumulator will have four times the amount of the multiplicand standing in it and the MC—5 accumulator will have five times the amount of the multiplicand standing upon it.

The machine is now ready to proceed with multiplication which operation is effected by adding selected multiples of the multiplicand or multiple multiplicand components. Thus, if the machine is to multiply by a digit 1, there will be a readout of the amount of the multiplicand from the MCRO—1 section of the MC—1 accumulator and the multiplicand amount itself will be entered into the LP accumulator. If on the other hand the multiplier is 2, the amount of the multiplicand as doubled by the readout MCRO—2 will be read out from this readout and entered into the RP accumulator. If the multiplier is 3 the double multiplicand amount will be read out from MCRO—2 and entered into RP and concurrently therewith the multiplicand amount will be read out from MCRO—1 and entered into LP. For a 4 multiplier the readout is from MCRO—4 and the entry is in RP. For a multiplier by 5 there is a readout from MCRO—5 which is enentered into RP. For a 6 multiplier there is a concurrent readout from MCRO—1 and MCRO—5, the multiplicand amount itself being entered into LP and five times the amount of the multiplicand being entered into RP. For a multiplier of 7 there is a concurrent readout from MCRO—2 and MCRO—5. Twice the multiplicand amount is entered into LP and five times the multiplicand amount is entered into RP. For a multiplier of 8 there is a readout from MCRO—4 and an entry into both the LP and RP accumulators and for a multiplier of 9 there is a concurrent readout from MCRO—4 and MCRO—5 and an entry into LP and RP respectively.

Following the foregoing entry operations there is a gathering together of the sums of components of products in the LP accumulator. The machine is then ready to record the result standing on the LP accumulator back upon the record from which the multiplier and multiplicand factors were derived.

It will be understood from the foregoing, that the present machine effects multiplication not by creating partial products as heretofore, but by adding together in proper denominational relation multiplicand multiples or multiple components which have been pre-set in receiving devices of the machine and/or upon means associated therewith and which are selected according to the digits of the multiplier. It will be further understood that column shift arrangements are provided to relatively shift the entries of successive factorial components of products as multiplication proceeds from column to column. A simplified form of cycle controller is also provided to eliminate idle machine cycles for orders of the multiplier where zeros appear. The machine also includes punch controlled contacts which are generally similar to correspondingly located punch controlled contacts in the Cunningham and Oldenboom patents above referred to.

Readouts

The readouts associated with the various entry receiving and product accumulating devices are generally similar to those previously used in the art with exception of the readout which is associated with the MC—1 accumulator. The MCRO—1 and 2 readouts will now be described. This readout arrangement comprises a lower readout directly driven from the wheels and designated MCRO—1 on Fig. 3b of the circuit diagram. Driven from this readout is a superimposed readout MCRO—2. Both the MCRO—1 and MCRO—2 readouts are of the so-called double type. The MCRO—1 readout has one section which is wired for direct readout of the amount of the multiplicand standing in the MC—1 accumulator. This is the section with the segment spots connected to the transverse bus wiring extending to the emitter 10. The other section of the MCRO—1 readout is a control section which is utilized in connection with readout of double amounts from the dual MCRO—2 readout.

Figure 3A:
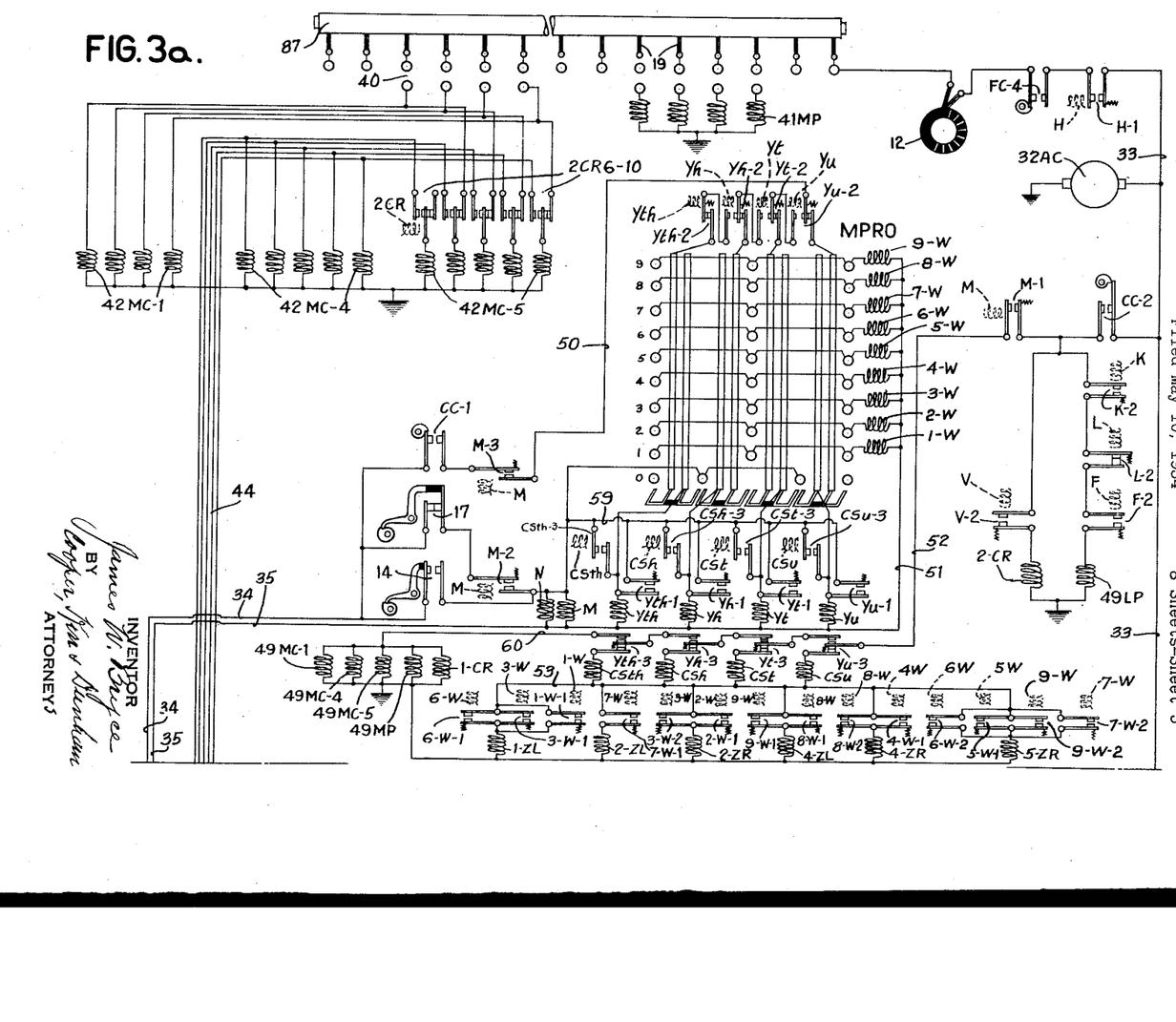
Figs. 3a, 3b and 3c taken together and arranged vertically in the order named, show the circuit diagram of the machine.
Figure 3B:
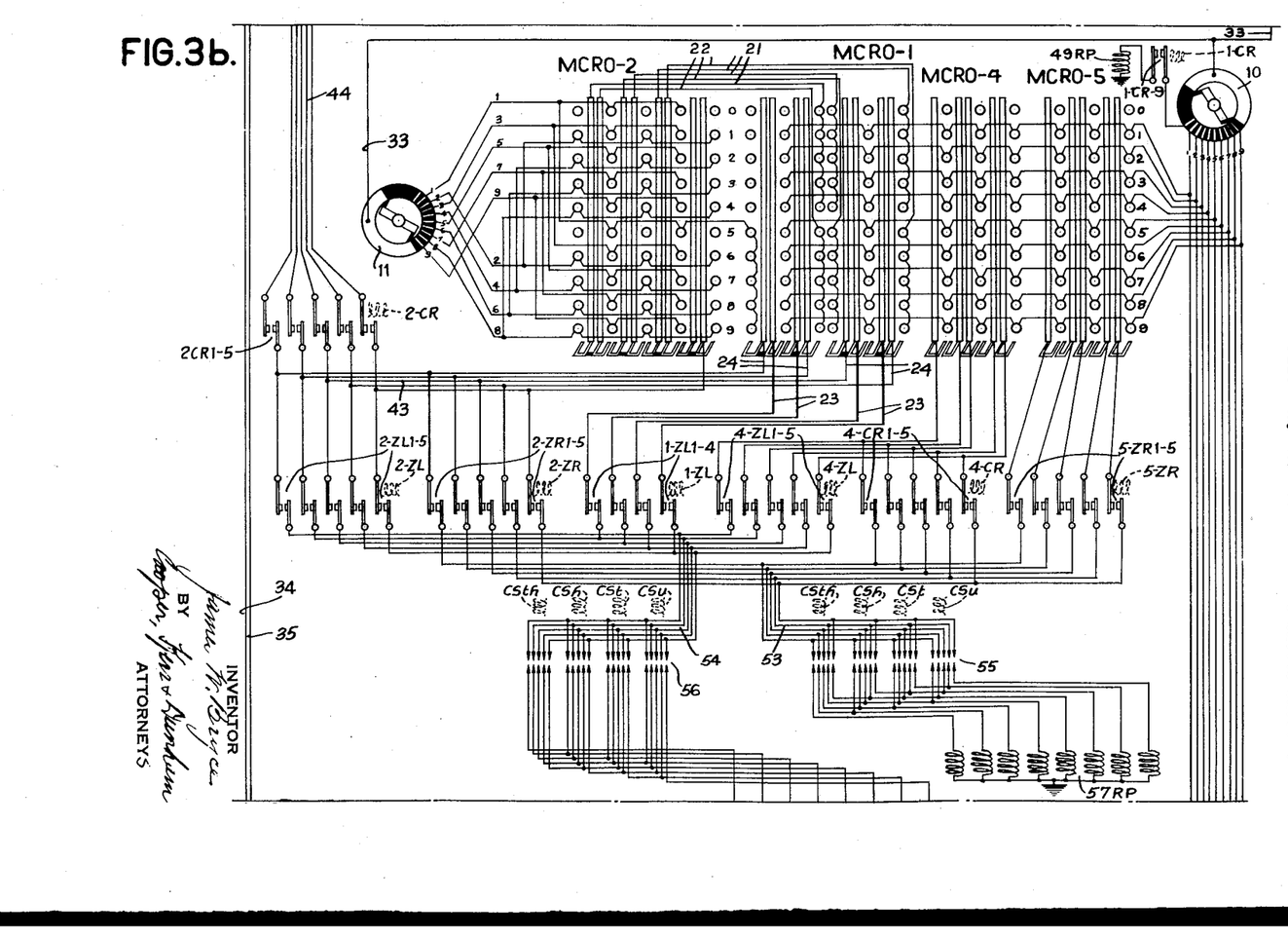

The MCRO—2 readout is so wired to the emitter 11 that any readout therefrom will be double that of the brush position. For example, if the units brush of the MCRO—2 readout is standing on the spot 7 by tracing the wiring to the emitter 11 it will be noted that there will be an actual readout of 4 which is twice 7 in the units place. However, when the double amounts are to be read out within the range of 5 to 9 the readout from the next higher order column must be increased by one, that is, if there is an entry of 19 into MC—1 the actual amount read out from MCRO—2 must be 38, the tens column reading being 1×2+1=3. This is provided for by extending the readout circuits from the tens, hundreds and higher order columns of the MCRO—2 readout to the extra or control section of the MCRO—1 readout. Wiring 22 and 21 is provided for this purpose. It will be noted that wiring 22 extends to spots 5 to 9 inclusive on the extra or control section of the MCRO—1 readout and that wiring 21 extends to spots 0 through 4 inclusive of the extra or control section of the MCRO—1 readout. As stated before, the MCRO—2 readout is of dual type with double sets of segments. One set of segment spots is so wired to the emitter 11 that if selected for readout under control of the control section of MCRO—1, a readout of an amount will be secured from the segments of MCRO—2 which is directly double the value of the brush setting in MCRO—2. The segment spots of the other section of MCRO—2 are so wired to emitter 11 that if selected for readout under control of the control section of MCRO—1, a readout of an amount will be secured which corresponds to double and brush position or setting in MCRO—2 augmented by 1. The units column of MCRO—2, however, always reads out double since no augmenting is required in this order. The mode of operation of this doubling readout structure can best be understood by considering two typical examples. Assume the number 14 to be entered into MC—1. The units order brush of MCRO—1 and MCRO—2 will stand on the 4 spot and the tens order brushes will stand on the ones spots. Starting with the 8 spot on emitter 11 the wiring extends to the 4 units order spot of MCRO—2. The right hand units order brush establishes circuit relations with such 4 spot and out via the common segment to one of the wires of the 43 group which ultimately connects to the units order of the products accumulator disregarding column shift so that 8 is entered therein. Now considering the tens order;—starting with the 2 spot on emitter 11, wiring extends to the one segment spot in the tens order of MCRO—2, circuit relations being established via the left hand tens order brush to the collector ring or common segment, then to the topmost wire of group 21 and down to the units order 4 spot in the control section of MCRO—1, then through the right hand units order brush, and out via the collector ring to the right hand line 24 which ultimately connects to the tens order of the products accumulator, disregarding column shift. This will provide for the entry of 2 in the tens order of such accumulator.

Now assume 19 to be entered into MC—1. When 19 is doubled, the result is 38 which means that the tens order must be augmented by one in doubling the one of the tens order. With 19 entered in MC—1, the units order brush of MCRO—1 and MCRO—2 will stand on the 9 spot and the tens order brushes on the 1 spot. Now tracing the circuit from the 8 spot of emitter 11, wiring extends to the 9 units spot on MCRO—2, and the circuit is established through the right hand units order brush, out via the common segment to one wire of the group of wires 43, which ultimately makes a connection to the units order of the products accumulator, disregarding column shift. In this way, 8 is entered in such order. Now considering the tens order, from the 3 spot of emitter 11, wiring extends to the one segment spot in the tens order of MCRO—2. Circuit relations are established via the right hand tens order brush to the collector ring, then to and over the uppermost wire of group 22 and down to the units order 9 spot in the control section of MCRO—1, thence through the right hand units order brush, out via the collector ring, to the right hand wire 24, which ultimately connects to the tens order of the product accumulator, disregarding column shift. This enters a 3 into such order. For doubling an amount from 5 to 9 the tens impulse will be transmitted through the tens brush in MCRO—2, which brush is at the zero position and thence through the units order brush in MCRO—1 and out via wire 24.

The special arrangement of wiring from the emitter 11 to the MCRO—2 readout provides for the required doubled amount to be read out. The other section of the MCRO—1 readout is utilized for a direct readout of the multiplicanid standing in the related counter. On the wiring diagram the heavy line readout lines 23 designate the wiring for a direct readout of the multiplicand amount and the lines 24 designate the lines through which the doubled amounts are secured which are derived from MCRO—2 through the control section of MCRO—1. It will be understood that for a direct readout from the regular readout section of MCRO—1 the number 10 emitter is utilized, whereas for a doubled readout from MCRO—2 as controlled by the extra section of MCRO—1, the number 11 emitter is utilized.

Circuit diagram

Figure 3C:
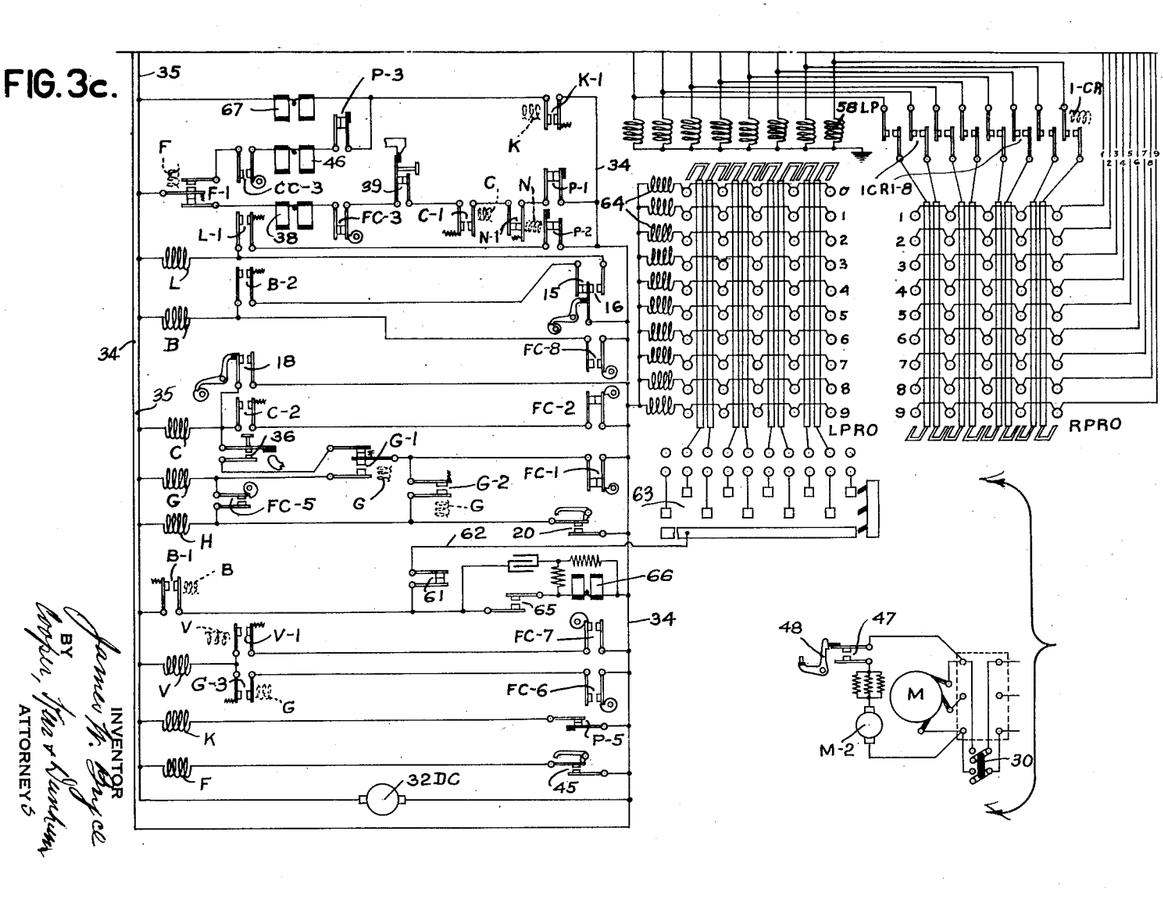

It will be assumed that properly perforated cards are in the supply magazine 29 of the card handling section of the machine (see Fig. 2). To start the machine in operation switch 30 (Fig. 3c) is first closed to supply current for the main driving motor M and for the punch driving motor M—2. Rotation of the main driving motor M puts into operation the A. C.-D. C. generator 32 (Figs. 1, 3a and 3c). The A. C. end of this generator supplies current to bus 33 and to ground and the D. C. end of the generator supplies current to buses 34 and 35 (Fig. 3c). The start key is now depressed to close start key contacts 36 and to complete a circuit from the 35 side of the D. C. line through relay coil C, relay contacts G—1 now closed, cam contacts FC—1, to the 34 side of the D. C. line. A stick circuit is established through relay contacts C2 and cam contacts FC—2 now closed. Energization of relay coil C also closes relay contacts C—1 establishing a circuit from the 35 side of the D. C. line through relay contacts F—1, through card feed clutch magnet 38 (see also Fig. 1a), through cam contacts FC—3, now closed, through stop key contacts 39, now closed, through relay contacts C—1 now closed, through relay contacts N—1 now closed, through the punch controlled contacts P—1 now closed and back to line 34. As in previous machines the start key must be kept depressed for the first four countercycles in starting up a run or alternatively it may be depressed and released and again depressed. Starting operations are prevented until the feed rack of the punch is in proper right hand position. This is provided for by contacts P—1.

Before starting up the machine the proper plug connections will be made at plug board 40 (see Fig. 3a) so that the amount of the multiplier will be entered from the multiplier field of the card into the MP receiving device, 41MP designating the counter magnets of the MP accumulator. Suitable plug connections are also made to enter the amount of the multiplicand into the MC—1 and MC—5 accumulators. 42MC—1 designate the counter magnets of the MC—1 accumulator. It will be noted that these accumulator magnets are wired to the accumulator magnets 42MC—5 which are the accumulator magnets of the MC—5 accumulator. The cross-wiring extends through contacts of a multi-contact relay, the points of which are designated 2CR—6 to 10 inclusive.

At the end of the first card feed cycle the first card will have been advanced to a point in which it is about to be read by the sensing brushes 19. During the second card feed cycle the card traverses the brushes 19 and the multiplier and multiplicand amounts are read from the card and entered into the receiving devices. The multiplicand, it will be understood in this cycle is entered into both the MC—1 accumulator and the MC—5 accumulator. At the end of the first card feeding cycle the card lever contacts 20 (see Figs. 2 and 3c) will be closed by the card causing energization of relay coil H (Fig. 3c) and causing relay contacts H—1 (Fig. 3a) to close. As the second card feed cycle ensues the card is carried past the brushes 19 and the factor amounts are entering into the multiplicand and multiplier receiving devices. The entry circuits will now be traced. Current flows from the A. C. line 33 (Fig. 3a), through relay contacts H—1 now closed, through cam contacts FC—4 which close at the proper time in the cycle, through impulse distributor 12 to the card transfer and contact roll 87, thence through the brushes 19 pertaining to the multiplier, through the plug connections at plug board 40 to the multiplier receiving device magnets 41MP. Similarly entries of the multiplicand are made into MC—1 and MC—5.

The hand initiating control is cut off after the operations have been properly started. This is effected in the following manner. At the beginning of the second card feed cycle the closure of cam contacts FC—5 (Fig. 3c) will cause relay coil to become energized. Current flows from line 35 through relay coil G, through cam contacts FC—5, through the card lever contacts 20 now closed and back to the other side of the line 34. The energization of relay coil G will shift the relay contacts G—1 to a reverse position interrupting the circuit to the start key contacts 36 but maintaining the circuit to cam contacts FC—1. The energization of relay coil G will also close relay contacts G—2 and establish a stick circuit for relay coils G and H either through the FC—1 cam contacts or the card lever contacts 20. It may be explained that the making time of cam contacts FC—1 overlaps the time when the card lever contacts 20 open between cards.

It has been previously explained that before multiplying operations by addition of complete sub-products is commenced, the amount of the multiplicand times 4 will have been set up in MC—4 and represented in MCRO—4 and that the amount of the multiplicand times 5 will have been set up in MC—5 and represented in MCRO—5. This is effected in the following manner. Provision is made for reading out double the amount of the multiplicand from the MCRO—2 readout for two successive cycles. On each of these cycles double the amount of the multiplicand is concurrently entered into MC—4 and MC—5, so that after these two cycles are completed MC—4 will have four times the amount of the multiplicand standing thereon and MC—5 will have five times the amount of the multiplicand standing thereon since the multiplicand itself had already been entered into the latter accumulator during the first cycle directly from the card.

Figure 6:
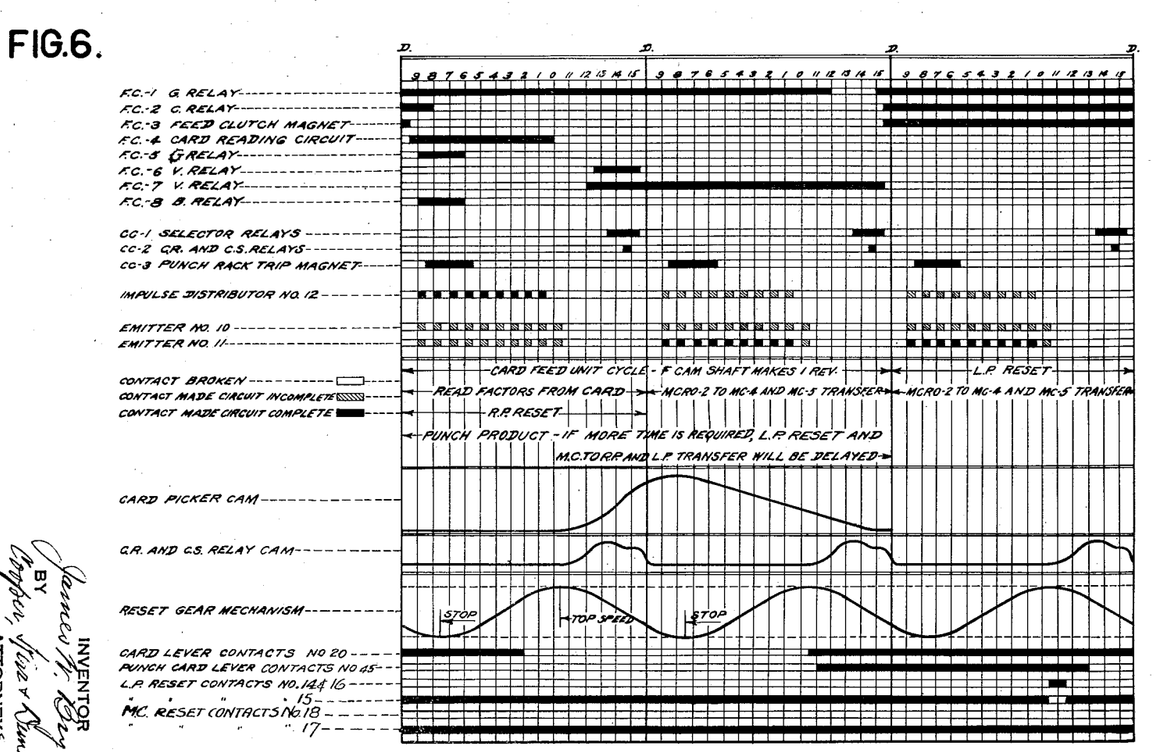
Figs. 6 and 6a taken together, show the timing diagram of the machine.
Figure 6A:
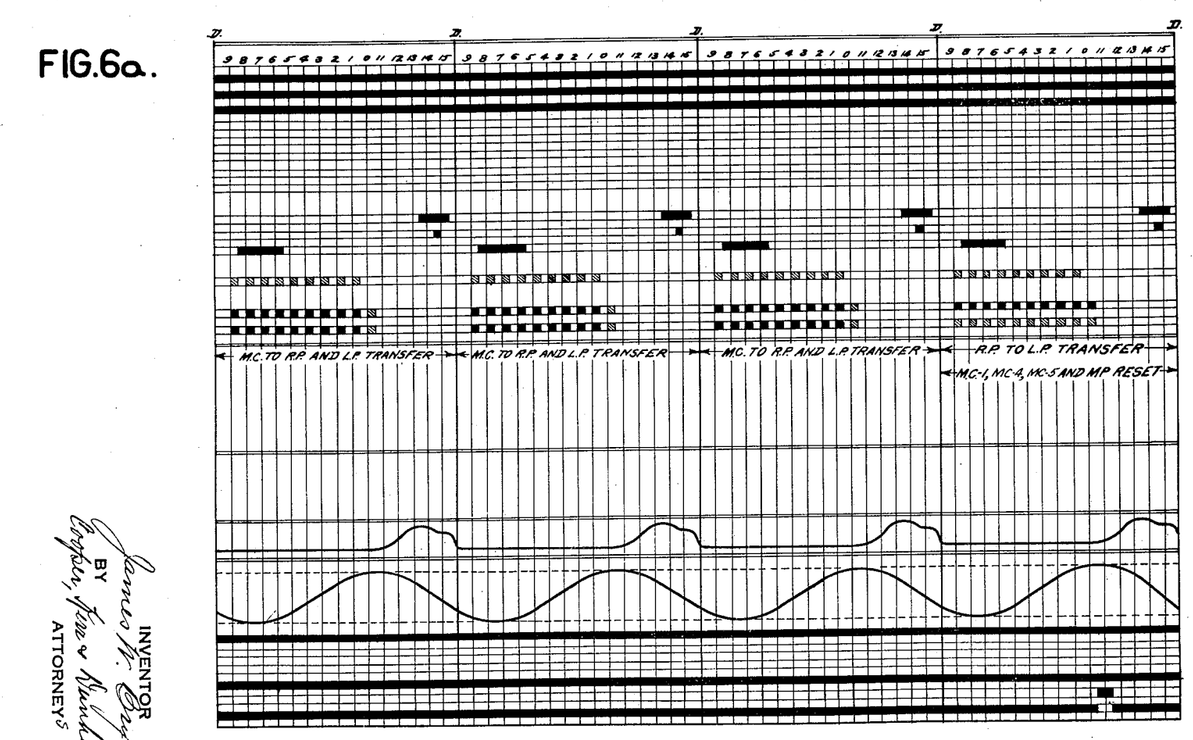

Referring now to Fig. 3c, the energization of relay coil G in the manner previously described will have closed relay contacts G—3. Upon closure of cam contacts FC—6, at the time shown in the timing diagram (see Fig. 6) a circuit is completed through relay contacts G—3 to energize relay coil V. The energization of relay coil V closes relay contacts V—1 providing a stick circuit for relay coil V through cam contacts FC—7. The energization of relay coil V (Fig. 3c) also closes relay contacts V—2 (Fig. 3a). Upon closure of cam contacts CC—2 current flows from the 33 side of the A. C. line through contacts V—2 to energize relay coil 2CR. The energization of relay coil 2CR shifts 2CR—1 to 5 (Fig. 3b) and 2CR—6 to 10 (Fig. 3a) to reverse position from that shown.

With the foregoing relay contacts closed and with emitter 11 in action (Fig. 3b) there is a readout of twice the multiplicand from MCRO—2 and the piloting section of MCRO—1 so that twice the amount of the multiplicand is entered into the MC—4 counter and the MC—5 counter, 42MC—4, 42MC—5 designating the respective accumulator magnets of these accumulators. This flow of impulses is via the group of lines generally designated 43 and 44. To provide for the subsequent repeated entry of double the multiplicand into the same accumulators provision is made for repeating the energization of 2CR upon the following counter cycle. Relay coil V (Fig. 3c) is maintained energized to provide for the re-energization of 2CR. This is provided for by cam contacts FC—7 (see Fig. 6 of the timing diagram). Accordingly, upon the following counter cycle after cam contacts CC—2 have reclosed, there is a further entry of double the multiplicand into MC—4 and MC—5 (see the timing diagram).

The card is fed through the card handling section of the machine and ultimately such card passes to the R position in the punch, closing card lever contacts 45 (see Figs. 2 and 3c), energizing relay coil F and shifting relay contacts F—1 to reverse position from that shown.

In starting up the machine the usual punch racks (shown in the Cunningham and Oldenboom patents) are in extreme outer position and accordingly contacts P—1, P—2, P—3 and P—5 are closed. With contacts P—5 closed, relay coil K will be energized and relay contacts K—1 will be in closed position. Upon the shifting of relay contacts F—1 and upon the closure of cam contacts CC—3, a circuit will be established to the punch clutch magnet 46. This circuit is completed to the other side of the line through the punch contacts P—3 now closed and relay contacts K—1 also closed. The energization of the punch clutch magnet 46 will cause closure of contacts 47 which become latched closed by the latch 48. Accordingly, current supply is provided for the punch driving motor M—2. The card which has been previously read and which is in the punching unit in the R position is now advanced endwise through the punch unit to a position in which punching is to commence.

According to the present invention multiplying by factorial addition and the set up of the cycle controller is initiated by the reset of the LP accumulator. LP accumulator reset is initiated as follows. Energization of relay coils F and K in the manner previously explained has caused closure of relay contacts F—2 and K—2 (Fig. 3a). Upon closure of cam contacts CC—2 current flows from line 33, through CC—2, through relay contacts K—2, through relay contacts L—2, through relay contacts F—2, through the 49LP reset magnet and back to ground. Energization of 49LP initiates the resetting of the LP accumulator (Fig. 1). During the reset of the LP accumulator the reset contacts 16 (Figs. 1 and 3c) close and a circuit is established to relay coil L causing opening of contacts L—2 (Fig. 3a) to prevent a repetition of the LP reset. A stick circuit is established for relay coil L through relay contacts L—1. The stick circuit extends to the other side of the line through the punch contacts P—2. At the proper time in the cycle of operation of the punch, contacts P—2 open to cause the relay coil L to become de-energized.

The machine is now ready to set up the cycle controller and to follow with the multiplying operation by addition of pair-able representing multiples of the multiplicand. Upon reset of the LP accumulator a circuit is established traced as follows: From the 34 side of the D. C. line (Fig. 3a) through the reset contacts 14 of the LP accumulator through relay coils M and N and back to the other side of the line 35. The energization of relay coil M closes relay contacts M—1, M—2 and M—3. Relay contacts M—2 establish a stick circuit for relay coil M through the now closed multiplicand reset contacts 17.

It will be assumed that the computation being performed by the machine is that of multiplying 0473×3682. In the manner previously explained, the amount 3682 will be set up in MC—1 and double this amount will be available to be read out from the MCRO—2 readout, which amount is 7364. Four times the amount of the multiplicand or 14,728 will be set up on MC—4 and five times the amount of the multiplicand or 18,410 will be set up on MC—5. The multiplier of 473 will be set up in the MP amount manifesting or receiving device and the first operation of the actual computing is to effect a multiplication by 3 in the units order.

It may be explained that the MPRO readout has a cycle controller associated with it which includes Y relay coils (Fig. 3a), stick relay contacts Yu—1 etc., transfer relay contacs Yu—2 etc., and supplemental transfer relay contacts Yu—3, etc.

With the foregoing computation the brush in the units order of the MPRO readout will be standing upon 3. Accordingly upon closure of cam contacts CC—1 (Fig. 3a) current will flow from the 34 side of the D. C. line, through CC—1, through M—3 now closed, via wire 50, through the Y—2 transfer contacts now in the position shown, through the units order brush to the coil of a relay designated 3—W. The prefix 3 signifies that the multiplication is by 3. The return circuit from coil 3—W is via wire 51 to the other side of the D. C. line 35. The energization of 3—W closes the group of relay contacts designated 3—W—1 and 3—W—2 (Fig. 3a).

It may be here explained that the energization of 3—W is intended to permit the entry of the amount of the multiplicand itself into LP and to permit the entry of double the amount of the multiplicand into RP. This is brought about in the following manner. Shortly after 3—W is energized, cam contacts CC—2 close allowing current to flow from the 33 A. C. line through CC—2, through relay contacts M—1 now closed, via wire 52, through the Yu—3 transfer contacts now in the position shown to energize the column shift relay magnet CSu and to allow current to flow via wire 53, through the now closed 3—W—1 contacts and through the now closed 3—W—2 contacts to energize relay coils 1—ZL and 2—ZR. In the above designation "L" signifies an entry into the LP accumulator and "R" signifies an entry into the RP accumulator and the prefix signifies the particular multiple of the multiplicand which is entered into either of the accumulators. Energization of 1—ZL causes closure of related contacts 1—ZL—1 to 4 (Fig. 3b) and the energization of 2—ZR closes relay contacts 2—ZR—1 to 5 (Fig. 3b). Accordingly, upon the operation of emitters 11 and 10 there will be a readout of double the multiplicand and an entry of double the multiplicand into the RP accumulator and an entry of the multiplicand itself into the LP accumulator. These entries it will be understood are made via the RP and LP entry circuits designated 53 and 54 respectively, which extend through the column shift relay contacts 55 and 56. On the diagram on Figs. 3b and 3c, 57RP are the accumulator magnets of the RP accumulator and 58LP are the accumulator magnets of the LP accumulator.

The machine has now entered 3682 into the LP accumulator and 7364 in the RP accumulator and is ready to effect a further entry according to the next higher column of the multiplier. In the problem under consideration, 7 is the amount of the multiplier in the tens order. Before such entry is made the CS$u$—3 relay contacts will have closed during the entry of the units order multiples of the multiplicand and upon closure of these CS$u$—3 contacts a circuit is established from the M—2 relay contacts (Fig. 3$a$) now closed, via wire 59, through the CS$u$—3 contacts, through the Y$u$ relay coil and back to D. C. line 35. Energization of Y$u$ will close its stick contacts Y$u$—1 to maintain Y$u$ energized and also shift the transfer contacts Y$u$—2 and Y$u$—3 to reverse position from that shown. Accordingly, when cam contacts CC—1 close, current will again flow through relay contacts M—3, via wire 50, through the now shifted Y$u$—2 contacts, through the non-shifted Y$t$—2 contacts to the tens order of the MPRO readout, through the brush standing on the 7 spot to energize relay coil 7—W. The energization of 7—W will close contacts 7—W—1 and 7—W—2 and ultimately upon closure of cam contacts CC—2 there will be an energization of relay coils 2—ZL and 5—ZR. The energization of these coils will in turn close their correspondingly numbered contacts 2—ZL—1 to 5 and 5—ZR—1 to 5 (Fig. 3$b$) so that on the following counter cycle there will be a readout of double the multiplicand from the MCRO—2 readout which will be entered into LP and concurrently therewith there will be a readout of five times the amount of the multiplicand from the MCRO—5 which will be entered into RP. The actual entry of the pairable representing multiples of the multiplicand is 7364 into LP and 18,410 into RP. The entry is made relatively one column to the left with respect to the foregoing entry under control of the column shift relay contacts controlled by CS$t$. This operation continues for the following cycle which, in the problem under consideration, is to be a multiplication by 4. In multiplying by 4 there is an entry of four times the amount of the multiplicand into the RP accumulator, this being provided for by the energization of relay control 4—ZR under the control of the 4—W relay coil.

It will be understood that the cycle controller functions as in previous machines to eliminate idle operations or cycles when zeros appear in the multiplier amount. In the present illustrative problem there is elimination of an operation in the fourth place in the multiplier where a zero appears.

The machine has now entered various complete sub-products into the LP and RP accumulators and the succeeding operations are as follows. The machine first gathers together the sum of the complete sub-products from one accumulator into the other accumulator. According to the present embodiment the components are gathered together in the LP accumulator. The machine also resets the MP accumulator and the various MC accumulators. After the entries of the pairable representing multiples of the multiplicand are complete all of the Y relay coils will have become energized and consequently all of the Y—3 transfer contacts will be in shifted position. Accordingly, when cam contacts CC—2 close a circuit will be completed through all of the Y—3 transfer contacts, via wire 60 to energize the 1—CR relay coil, the 49MP reset coil, and the 49MC—1, 49MC—4, 49MC—5 reset coils. The energization of the reset coils initiates reset of the MC—1, MC—4 and MC—5 accumulators. The energization of relay coil 1—CR will close relay contacts 1—CR—1 to 8 (Fig. 3$c$) so that upon operation of the emitter 10 (Fig. 3$b$) impulses will be emitted through the RPRO readout through the 1—CR—1 to 8 contacts now closed and such impulses will flow to the 58LP accumulator magnets to energize them and to transfer over into the LP accumulator the amount standing in the RP accumulator. After such amount has been transferred from RP into LP the emitter 10 (Fig. 3$b$) on encountering the extra spot, will cause energization of reset coil 49RP, relay contacts 1—CR—9 being closed at this time. The energization of 49RP will initiate reset of the RP accumulator. Upon the reset of the MC—1 accumulator, reset contacts 17 (Fig. 3$a$) will open to break the stick circuit for relay coils M and N and for all of the Y coils, thus preparing the cycle controller for a new entry from the following card. The reset of the multiplicand accumulator MC—1 also causes closure of reset contacts 18 (Fig. 3$c$) which causes energization of relay coil C. The energization of relay coil C causes closure of relay contacts C—1 and there is a reinitiated energization of the card feed clutch magnet 38 in the manner previously described.

The machine is now ready to punch back the product on the record card, which operation is initiated in the following manner. Early in the reinitiation of the card feed cycle cam contacts FC—8 (Fig. 3$c$) close, energizing relay coil B, closing stick contacts B—2 and providing a stick circuit for relay coil B through the LP reset contacts 15 now closed. The energization of relay coil B also closes relay contacts B—1. Current will flow from line 35 through B—1 now closed, through the punch escapement contacts 61, via a line 62 to the readout strip 63. With the current thus supplied to the readout strip and with the brush of the readout standing on the first of the spots at which punching is to commence the punching operation will start, there being a readout through the LPRO readout and an energization of the punch selector magnets 64. The closure of relay contacts B—1 (Fig. 3$c$) also supplies current to contacts 65 in the punch, which contacts are closed by interposer action to supply current to the punch operating magnet 66. Punching now proceeds and will continue until the complete product is read out and punched. When the punching operation is completed, contacts P—5 will become closed energizing relay coil K and closing relay contacts K—1 to establish a circuit to the ejector magnet 67. The punched card will then be ejected from the punch. A new operation will then be initiated for the succeeding record card. Such succeeding operation is initiated by the closure of relay contacts K—2 and F—2 and upon the reset of the LP accumulator as hereinbefore described. It may also be explained that upon LP reset contacts 15 open to break the stick circuit for relay coil B and cause relay contacts B—1 to open the circuit to the punch operating magnets and to cut off the circuits to the readout strip 63 of the punch.

Figure 4:
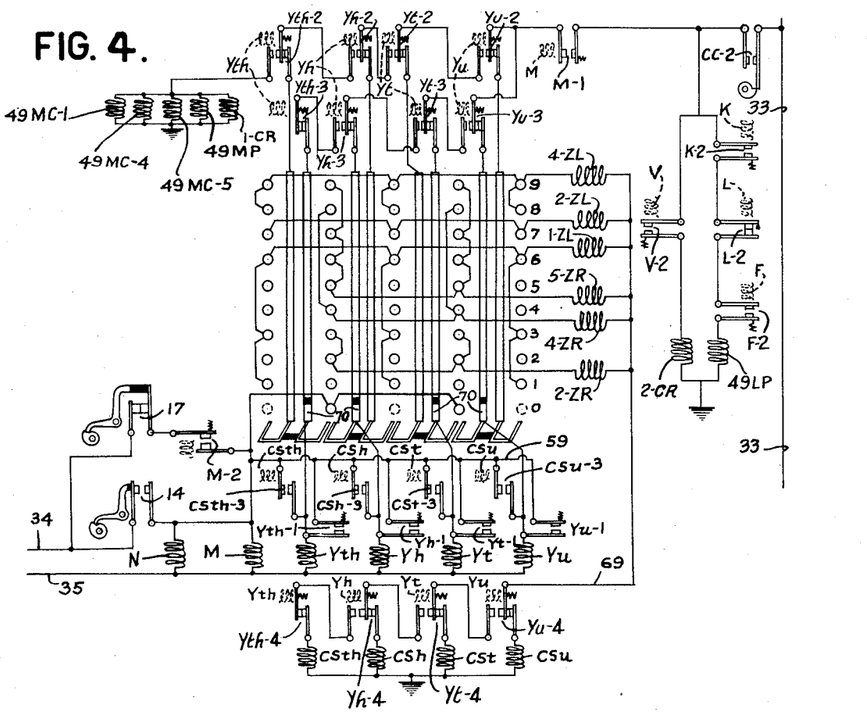
Fig. 4 is a modification of one section of the circuit diagram.

Referring to Fig. 4 there is here shown a modified arrangement of the MPRO readout, cycle controller, and control for the multi-contact relays 4—ZL, 2—ZL, 1—ZL, 5—ZR, 4—ZR and 2—ZR. In lieu of utilizing a control from the MPRO readout to set up relay coils such as 3—W, 4—W, etc. (Fig. 3$a$), which relays in turn, through contacts bring about selective energization of the aforementioned multi-contact relays, a different arrangement is provided which requires certain special circuit connections and certain special wiring of the MPRO readout. Referring to Fig. 4, the cycle controller embodies the Y relay coils designated Yu, Yt, etc. There are also the stick relay contacts Yu—1, etc., and, in lieu of the simple transfer contacts, triple transfer contacts are employed. These are respectively designated Yu—2, etc., Yu—3, etc. and Yu—4, etc. The MPRO readout is of double form and both sections are employed for controlling the relay coils 4—ZL, 2—ZL, etc. The wiring for these different coils will now be traced. As shown the 4—ZL relay coil is wired to the ninth and eighth spots of one section of the readout. The 2—ZL coil is wired to the seventh spot of one section only. The 1—ZL coil is wired to the sixth, the third and the first spots of the same section. The other section of the readout is wired as follows: The ninth, seventh, sixth and the fifth spots are interconnected and wired to the 5—ZR relay coil. Likewise on this section the eighth and the fourth spots are wired together and are connected to the 4—ZR relay coil. Also on this section the third and fifth spots are wired together and are connected to the 2—ZR relay coil. The operation need not be traced for the complete problem, but the manner of energization of the relay coils for a multiplier factor of 3 will be described. With 3 in the units order of the multiplier the units order brush assembly will be so position that the brushes stand respectively on the two third spots one in each of the two readout sections related to the units order. With relay contacts M—1 closed and upon closure of cam contacts CC—2, current will flow through the non-shifted Yu—2 transfer contacts down through the common strip of one section of the readout, out through the common strip of one section of the readout, out through the brush standing on the third spot and out to relay coil 1—ZL. This will control the entry of the multiplicand itself into the LP accumulator. Concurrently with this action current will flow also through the non-shifted Yu—3 transfer contacts down through the common strip of the other section of the readout in the same column over through the brush standing on the third spot and out to relay coil 2—ZR. This will control the entry of two times the multiplicand into the RP accumulator. The return circuit from the above mentioned 1—ZL and 2—ZR relay coils is via a wire 69, down through the non-shifted supplementary Yu—4 transfer contacts to energize the column shift relay magnet CSu and to ground. On operations in higher orders there will be a corresponding selection of relay coils for operation. For example, if the multiplier factor is 7 in the tens order the current flowing in through the non-shifted Yt—2 transfer contacts will flow out through the brush at the seventh spot in one section and over to the 2—ZL relay coil. The current flowing through the non-shifted Yt—3 transfer contacts will flow out from the common strip via the brush at the seventh spot to the 5—ZR relay coil. Accordingly, for a multiplier factor of 7 twice the multiplicand will be entered into the LP accumulator and five times the multiplicand will be entered into the RP accumulator. The balance of the circuits need not be traced in detail as they are the same as in the other embodiment which was previously described.

Upon the completion of computing operations, all of the Y—2 transfer contacts will be in shifted position and ultimately the 1—CR relay coil and the various multiplicand and multiplier reset magnets will be energized as in the previous embodiment.

In the alternative embodiment the common segments pertaining to one section in each column have a portion insulated from the rest of the common segment, which portion is utilized for zero control of the cycle controller. This section is designated 70 in Fig. 4.

Summarizing, the operation of the present machine is as follows. In lieu of effecting multiplication by simple over and over addition or as has been effected heretofore by entering partial product components which are created during the multiplying operation the present machine employs the principles of addition and the entry of multiples of the multiplicand into accumulating means. Briefly the machine builds up by addition, multiples of the multiplicand based on the entered multiplicand as follows in the first three cycles.

Table I

| | | | |
|---|---|---|---|
| 1st cycle | MC—1=2 | MC— | MC—1 |
| 2nd cycle | MC—1=2 | MC— | MC—2=MC—3 |
| 3rd cycle | MC—1=2 | MC—2=MC—4 | MC—2=MC—5 |

The foregoing operations it will be understood are obtained by addition with the exception of the representation for the multiplicand times 2 which is obtained directly from the supplementary readout on the MC—1 accumulator. Subsequently when the machine is to actually obtain the products it proceeds by adding multiples of the multiplicand components of products in the manner set forth in Table II which follows. In this table under MP are represented various possible multiplier factors. Under LP are represented the entries which will be directed into the LP accumulator. Thus if the multiplier factor is 2 the table shows that the multiplicand times 2 will be entered into the RP accumulator and so on. Under RP are the entries that will be directed into the RP accumulator.

Table II

| MP | LP | RP |
|----|----|----|
| 1  | 1  | ---|
| 2  | ---| 2  |
| 3  | 1  | 2  |
| 4  | ---| 4  |
| 5  | ---| 5  |
| 6  | 1  | 5  |
| 7  | 2  | 5  |
| 8  | 4  | 4  |
| 9  | 4  | 5  |

After the foregoing components of products are entered into the LP and RP accumulators, the gathering together operation sets up the complete product in one of the aforementioned accumulators. In this instance such accumulation is secured in the LP accumulator.

Figure 5:
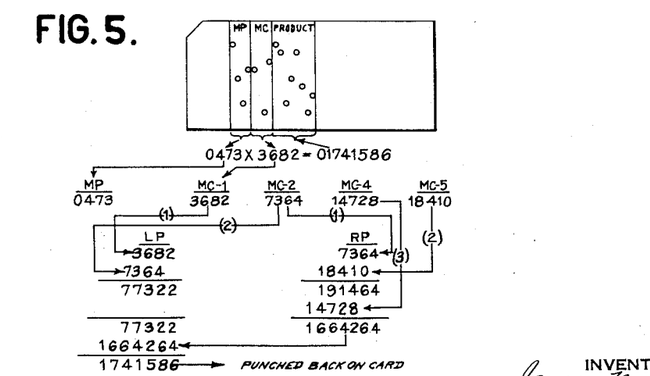
Fig. 5 is a view showing a typical computation as performed by the machine.

Figure 5 shows an illustrative computation and the various steps of operations for effecting multiplying by factorial addition methods.

By referring to Fig. 5 it will also be noted that in the actual computation after the various multiples of the multiplicand have been set up on the multiplicand entry receiving devices that the number of additive entry cycles required for carrying out multiplication comprises one additive entry cycle for each significant digit column of the multiplier plus an additional cycle for combining together the sums of components of products. It may be explained that the entry of the multiplicand and the setup of the multiples thereof requires three accumulator cycles, but such cycles are not extra cycles, inasmuch as two of these accumulator cycles are consumed with record feeding, record reading and card handling and the third is utilized for reset of the final product or LP accumulator. It will be understood that the actual number of accumulator cycles required for effecting the entry and computation of any given problem will be three accumulator cycles plus one extra accumulator cycle for each significant digit column of the multiplier plus one additional cycle for gathering and combining the components of products into a single products receiving means. Accordingly, the present machine effects multiplying by addition under certain conditions at a relatively more rapid speed than in previous machines which effected multiplication by over and over addition. Such machines heretofore required a number of additive entry cycles depending upon and equal to the numerical value of a digit in the column of the multiplier. For example, if the multiplier digit in a given column was 9, previous machines would require nine additive entry cycles for the actual computation. The present machine requires a maximum of two additive entry cycles for the computation itself and a maximum of three preparatory counter cycles or a total of 5. With the present machine the number of additive entry cycles for the actual computation does not vary with variation in the digit value of the multiplier in a given column. For example, the number of cycles for multiplying by 9 is the same as would be required for multiplying by one, that is there would be required one cycle plus a gathering together cycle. Accordingly, the relative speed of the present machine is much higher than previous machines which effected multiplication by over and over addition.

What I claim is:

1. An accounting machine for effecting multiplying computations comprising a plurality of multiplicand entry receiving devices, means for effecting the entry of a multiplicand in certain ones of said devices, means under control of one of said certain devices for effecting the entry of a multiple of said multiplicand as contained in said one device into others of said devices to set up therein various multiples of the multiplicand, a multiplier entry receiving device, product receiving means and means under the control of said multiplier entry receiving device for entering into the product receiving means the multiplicand or multiples thereof derived from said multiplicand entry receiving devices which multiples are selected according to the digits of the multiplier.

2. A multiplying machine comprising in combination, a number of accumulators for multiples of the multiplicand, means for entering a multiplicand into certain of said accumulators, means for transferring amounts based upon the multiplicand amounts entered in the said certain accumulators to other of said accumulators so that the accumulators will register an incomplete series of multiples of the multiplicand, multiplier factor manifesting means, multiple selecting means controlled thereby for automatically selecting certain of said multiples in accordance with each digit of a manifested multiplier for entry into product accumulating means and product accumulating means for summing the selected multiples.

3. In a machine of the character described, the combination of means to store multiples of a multiplicand; means to store a multiplier; means to enter multiples of the multiplicand and the multiplier in their respective storing means; means to interpret each digit of the multiplier; means controlled by the interpreting means to sub-totalize the multiplicand storage means containing multiples of the multiplicand corresponding to the digits of the multiplier being interpreted; and means to accumulate the multiples of the multiplicand as they are sub-totalized to obtain a complete product.

4. In a machine of the class described, the combination of means to store multiples of a multiplicand; means to store a multiplier; means to enter multiples of the multiplicand and the multiplier in their respective storage means; means to interpret each denominational digit of the multiplier; means to accumulate multiples of the multiplicand to obtain a complete product; and means rendered effective by the interpreting means as each denominational digit of the multiplier is interpreted to transmit the multiple of the multiplicand corresponding to each interpreted digit of the multiplier from the multiplicand storage means to the accumulator means.

5. In a machine of the class described, the combination of a plurality of multiplicand storage devices; a multiplier storage device; means to enter multiples of the multiplicand and the multiplier in their respective storage devices; a plurality of product storage devices; and automatic means governed by the multiplier storage device to transfer multiples of the multiplicand corresponding to the denominational digits of the multiplier from the multiplicand storage devices to the product storage devices.

6. A record controlled accounting machine of the type which reads factors from a record and records the product upon the record from which the factors were obtained, comprising entry receiving means for the two factors, products receiving means for controlling product recording, means under the control of the receiving means for one factor upon which representations of multiples of such factor may be set up, means for transferring values from the entry receiving means for said one factor to the means upon which representations are set up, and means under the control of the entry receiving means for the other factor for controlling the entry of the factor or multiples thereof into the products receiving means.

7. In a multiplying machine including in combination accumulative type entry receiving devices for multiplicand multiples, entry effecting means for entering a multiplicand into certain of said devices, means for forming predetermined digital multiples of the multiplicand in some of said receiving devices under control of one of said certain entry receiving devices, a multiplier receiving device and entry egecting means therefor, product receiving devices, means controlled by said multiplier receiving device in accordance with digital multiplier values therein for selectively connecting the multiplicand multiple receiving devices with the product receiving devices and means to transfer selected multiplicand multiples from said multiplicand multiple receiving devices to said product receiving devices.

8. In a multiplying machine a plurality of receiving devices for representing multiples of a multiplicand, record controlled means for effecting entry of a multiplicand, means for transferring values intermediate certain of said entry receiving devices, cyclically operable means, and means controlled by said cyclically operable means for causing said record controlled entry effecting means to enter values in predetermined receiving devices, and for causing said transfer means to enter values in predetermined receiving devices whereby predetermined digital multiples of the multiplicand are formed in said receiving devices, multiplier factor receiving means, record controlled means to set up a multiplier therein, product receiving means, entry routing connecting means controlled by the multiplier factor receiving means according to the digital values of the multiplier for selectively connecting the multiple representing means to the product receiving means, and means to transfer the selected multiples to the product receiving means.

9. A multiplying machine including in combination entry effecting means for a multiplier and a multiplicand, receiving means for a multiplier, a plurality of receiving devices and means for representing multiples of a multiplicand associated therewith, devices for transferring values intermediate certain of said representing means and certain of said entry receiving devices, cyclically operated means, and means controlled by said cyclically operable means for causing said entry effecting means to enter values in predetermined receiving devices, and for causing said transfer devices to enter values in predetermined receiving devices whereby a set of complete digital multiples of the multiplicand are represented on said representing means, product receiving means for receiving complete multiples of the multiplicand from the aforesaid representing means, and transfer means having entry routing means controlled selectively by the multiplier receiving means according to the digital value or values of the multiplier therein for selectively transferring a selected multiple or multiples from the representing means to the product receiving means.

10. A machine according to claim 9, wherein further cyclically operable control means are provided to cause automatic operation of said multiple transfer means after said multiples of the multiplicand are formed.

11. A machine according to claim 9 wherein the multiplier receiving means selectively conditions control devices which set said entry routing means so that said multiple transfer means concurrently effects a plurality of multiplicand multiple entries in said product receiving means.

12. A machine according to claim 9 wherein the product receiving means comprises two accumulators and wherein the entry routing means may be selectively conditioned to cause said multiple transfer means to effect a single multiple entry into one accumulator or plural multiple entries one into each accumulator.

13. A machine according to claim 9 wherein the product receiving means comprises two accumulators and wherein the entry routing means may be selectively conditioned to cause said multiple transfer means to effect a single multiple entry from any representing means into one accumulator or from a certain representing means to both accumulators or from two representing means each to a separate accumulator.

14. In a multiplying machine having a plurality of devices for representing predetermined complete digital multiples of a multiplicand, and wherein the multiplicand multiples are formed in said devices by direct entry of a multiplicand from an entry control means and by transfers intermediate said devices including in combination products receiving means adapted to receive multiples from said representing devices, multiplier receiving means with means for entering a multiplier thereinto, entry routing connecting devices between the representing devices and the products receiving means, selecting means for said last named means controlled by the multiplier receiving means for selectively routing one or a plurality of multiple entries according to whether a multiplier digit requires a single multiple entry only or a pair of multiple entries and means for transferring such multiple or multiples to the product receiving means.

15. In a multiplying machine having multiplier manifesting means, means for entering a multiplier therein and product receiving means, accumulative type entry receiving devices for multiplicand multiples, entry effecting means for entering a multiplicand into certain of said devices, means for forming predetermined digital multiples of the multiplicand by entries in some of said receiving devices under control of one of said certain entry receiving devices, a set of representing means positioned by said receiving devices for representing a plurality of individually complete digital multiplicand multiples constituting an incomplete series, said representing means providing multiples which may be combined to form any missing term of the series by utilizing not more than two multiples, interpreting means controlled by the multiplier manifesting means for interpreting the manifested multiplier digits, routing and connecting means controlled by said interpreting means between the representing means and the products receiving means for selectively directing the entry of a single multiplicand multiple or a pair of multiplicand multiples from the multiple representing means into the product receiving means and means for causing the aforesaid multiplicand multiple or multiples so selected by the foregoing means to be entered into the product receiving means.

16. A machine according to claim 15 wherein one of said multiplicand multiple receiving devices conditions a plurality of representing means for representing a plurality of different multiplicand multiples.

17. In a multiplying machine, a plurality of receiving devices for representing multiples of a multiplicand, means for effecting entry of a multiplicand, means for transferring values intermediate certain of said entry receiving devices, cyclically operable means, and means controlled by said cyclically operable means for causing said entry effecting means to enter values in predetermined receiving devices, and for causing said transfer means to enter values in predetermined receiving devices whereby an incomplete series of digital multiples of a multiplicand is represented by said receiving devices, multiplier factor receiving means, means to set up a multiplier therein, product receiving means, entry routing connecting means controlled by the multiplier factor receiving means according to the digital values of the multiplier for selectively connecting a multiple representing means to the product receiving means when a multiplier digit corresponds to an available multiplicand multiple representation, or for connecting a plurality of multiple representing means to said product receiving means when a multiplier digit has no corresponding multiplicand multiple representation in said representing devices.

18. In an accounting machine having an emitter and including a multiple order readout cooperating with said emitter, said readout comprising segments and brushes, which brushes are positioned in accordance with an amount and said readout having means comprising fixed circuit connections connecting the brushes and segments and the emitter whereby a reading may be derived from the readout which is twice the amount represented by the brush positions, and said readout also including supplemental brushes and segments with fixed wiring connections for altering the circuit relations established by the first mentioned set of brushes and segments to the emitter whereby the reading provided by the fixed circuit connections, brushes and segment in cooperation with the emitter, comprises twice the amount represented by the brush augmented by one in one order when double the amount corresponding to the brush positioned in a lower order contains a carry over amount.

19. In an accounting machine having emitting means and including a multiple order readout cooperating with said emitting means, said readout comprising sets of segments and brushes which brushes are positioned in accordance with an amount, said readout having means comprising circuit connections cooperating with one set of segments and cooperating with a part of said emitting means whereby a reading may be derived of an amount directly corresponding to the amount position of the brushes, said readout having means comprising other fixed circuit connections connecting other brushes and other sets of segments and another part of said emitting means whereby a reading may be derived which is twice the amount represented by the brush positions and said readout also including supplemental brushes and segments with fixed wiring connections for altering the circuit relations established by the said other brushes and segments to said other part of the emitting means whereby the reading provided by the fixed circuit connections comprises twice the amount represented by the brush augmented by one in one order when double the amount corresponding to the brush position in a lower order contains a carry over amount.

20. In an accounting machine having emitting means, a readout cooperating with said emitting means, said readout comprising brushes settable according to numerical values, a main dual segment section and a supplemental control segment section, circuit connections to the emitter from one segment section of the main dual section whereby direct readings which are double the number corresponding to brush sections may be derived, circuit connections to the emitting means from the other segment section of the main dual section whereby double readings augmented by one may be derived, and means for utilizing the control segment section for determining from which segment section of the main dual section the readings are to be derived whereby direct double readings or augmented double readings may be derived as required.

21. A doubling readout having denominational order elements which are set according to numerical values of an amount to be doubled, a set of digit representing input lines to said readout, a set of denominationally ordered output lines from said readout, circuit establishing means in said readout set by the aforesaid denominational order elements, circuits established thereby between the input lines and output lines for selectively connecting each of the denominationally ordered output lines to the digit representing lines which are representative of double the amount as represented by each denominational order element, and supplemental circuit establishing means in said circuits controlled by the denominational order elements, said supplemental circuit establishing means of each lower order modifying the circuit established by said first circuit establishing means in each relatively higher order to connect the denominationally ordered output line of said higher order to an input line corresponding to twice the digit represented by the higher denominational order element plus one, when double the digit represented in the lower denominational order element contains a carry over unit.

JAMES W. BRYCE.

CERTIFICATE OF CORRECTION.

Patent No. 2,166,928.        July 25, 1939.

JAMES W. BRYCE.

It is hereby certified that error appears in the printed specification of the above numbered patent requiring correction as follows: Page 4, second column, line 64, for "multiplicanid" read multiplicand; page 5, second column, line 16, for "coil" read coil G; page 8, second column, line 29, Table I, for "MC—" read MC—2; line 46, for "entires" read entries; page 9, second column, line 65, for "egecting" read effecting; page 10, first column, line 29, claim 9, for "operated" read operable; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.